(12) United States Patent
Sukenari

(10) Patent No.: US 7,517,161 B2
(45) Date of Patent: Apr. 14, 2009

(54) IMAGING DEVICE

(75) Inventor: Kazuhiro Sukenari, Nagoya (JP)

(73) Assignee: Elmo Company Limited (JP)

( * ) Notice: Subject to any disclaimer, the term of this patent is extended or adjusted under 35 U.S.C. 154(b) by 404 days.

(21) Appl. No.: 11/274,852

(22) Filed: Nov. 14, 2005

(65) Prior Publication Data

US 2007/0003274 A1 Jan. 4, 2007

(30) Foreign Application Priority Data

Jul. 1, 2005 (JP) ............................. 2005-193738

(51) Int. Cl.
G03B 17/00 (2006.01)
H04N 5/225 (2006.01)
E05D 11/10 (2006.01)

(52) U.S. Cl. ...................... 396/428; 348/373; 16/319

(58) Field of Classification Search ............... 396/428, 396/419; 248/274.1, 276.1, 292.13; 353/62–65; 348/63, 373–376; 16/319, 321–322
See application file for complete search history.

(56) References Cited

U.S. PATENT DOCUMENTS

| | | | | |
|---|---|---|---|---|
| 4,457,610 A | * | 7/1984 | Kawazoe | ..................... 396/428 |
| 5,947,429 A | * | 9/1999 | Sweere et al. | .......... 248/123.11 |
| 6,893,132 B2 | * | 5/2005 | Mori et al. | ..................... 353/63 |
| 6,935,601 B2 | * | 8/2005 | Tanaka | ..................... 248/294.1 |
| 2002/0094203 A1 | * | 7/2002 | Tseng et al. | ................. 396/428 |
| 2004/0021834 A1 | * | 2/2004 | Satomi | ........................ 353/65 |

FOREIGN PATENT DOCUMENTS

JP 5-236203 9/1993

* cited by examiner

Primary Examiner—W. B. Perkey
Assistant Examiner—Minh Phan
(74) Attorney, Agent, or Firm—Ostrolenk, Faber, Gerb & Soffen, LLP

(57) ABSTRACT

To make more effective use of the circumference of arm rotation while assisting the arm rotation in terms of the rotatability of an arm that holds a camera head, resulting in a more compact device.

The imaging device 100 holds a camera head 120 against a table 110 by means of a camera holding arm 140, and the camera holding arm 140 is axially supported rotatably so that the degree of incline relative to the table 110 is variable. A coil spring 260 is incorporated in a through hole 203b, as well as a recess 143k continuous therewith, about the axis of a first subaxial pin 220 aligned with the axis of the arm axial support. The coil spring 260 assists rotation by building up coil spring stress while the camera holding arm 140 (base 143) rotates toward the table 110, and by allowing the coil spring stress to be exerted in the form of assisting force on the arm when the base 143 rotates in such a way that the angle of incline with the table 110 expands.

4 Claims, 13 Drawing Sheets

IMAGING DEVICE

CLAIM OF PRIORITY

The present application claims priority from Japanese Application P2005-193738 filed on Jul. 1, 2005, the content of which is hereby incorporated by reference into this application.

BACKGROUND OF THE INVENTION

1. Field of the Invention

The present invention relates to an imaging device that images a target object mounted on a table by a camera head from above the table.

2. Description of the Related Art

When not in use, the camera head, which is a precision device, in this type of imaging device should be kept as stable as possible when held against the table by an arm. The total height of the device for tilting the support arm toward the table to bring the camera closer to the table is lowered, for example. The way the camera head is held by such an arm can be seen in Japanese Patent Laid-open Gazette No. 2005-23620A, for example.

In the imaging device disclosed in that Patent Citation, even though the arm is assisted by a spring provided at the base of the arm when the arm holding the camera head is pulled up from the table, there is still room for the following improvements in this imaging device.

For example, the cable for the signals obtained by the camera head held by the arm and the cable for supplying power to the camera must be routed into the device chassis, and often into the device table. There is usually enough wiring space inside the and table is used as a place for wiring in order to shorten the length of the cable from the arm to the table. When cable is located in the circumference of rotation between the arm and table, the wiring and spring can interfere with each other, and as such interference has not been taken into sufficient consideration, the cable can become damaged by contact with the spring. The circumference of the arm rotation thus becomes what is referred to as dead space, which is not used to set up wiring or the like.

As the mounted spring is used not only to provide force when pulling up the arm but also to support the incline of the arm, substantial spring force is required. Wider space is thus needed to mount the spring to increase the number and size of the springs, leading to an increase in the number of arm engagement locations and thus the size of the device.

An object of the present invention is thus to overcome the above problems involved in the structure and rotatability of the arm that supports the camera head, so as to make more effective use of the circumference of the arm rotation while assisting the arm rotation, resulting in a more compact device.

SUMMARY

In order to solve at least a part of these problems stated above, an imaging device of the present invention comprises the camera holding arm, which holds the camera head in such a way that the imaging-object is imaged from above the table, is axially supported rotatably relative to the table by means of an arm support module in such a way that the degree of incline relative to the table is variable. In addition to axially supporting the camera holding arm in this manner, the imaging device of the invention comprises an assist member and a frictional force adjustment module, where assisting force built up by the assist member is exerted on the camera holding arm to assist in the rotation when the arm rotates in such a way that the incline relative to the table expands. Due to the adjustment of frictional force by means of the frictional force adjustment module, the camera holding arm is held in a position inclined relative to the table, and the camera holding arm is prevented from accidentally rotating by the assisting force built up by the assist member. In other words, the camera holding arm is held at an incline relative to the table by the frictional force adjustment module, resulting in no need to involve the assist member in pulling up or holding the arm at an incline. Because the magnitude of the of this assisting force should thus be enough to assist in the rotation of the camera holding arm when the incline relative to the table expands, it is possible to devise a more compact assist member, and thus a more compact component for support of the axis of rotation of the camera support as well as the imaging device itself.

Furthermore, since the assist member is housed in compartmentalized housing formed inside the camera holding arm, the empty space in the arm other than the housing can be effectively used to set up wiring cable or power cable as far as the circumference of the housing. Although cable is laid as far as the circumference of the housing, the partition walls in the cable will prevent the cable from interfering with the assist member and thus from becoming damaged.

The imaging device of the invention described above may be implemented in a variety of aspects. For example, the arm support module can axially support the camera holding arm rotatably about the axis of rotation relative to a frame which the table has for supporting the camera holding arm, and the camera holding arm can be compartmentalized to allow the assist member to be mounted, from the side of the frame, in the housing. The frictional force adjustment module can be frictional force-adjustably formed on the side of the frame, and the assist member can be composed of a coil spring, which is engaged at one end of the coil spring with the camera holding arm and at the other end of the spring with the frame, while housed in the housing. In this way, the assist member has the simple structure of a coil spring, allowing the rotation of the camera holding arm, when the incline relative to the table expands, to be assisted by the coil spring stress built up by the coil spring. In addition, the operations of adjusting the frictional force and housing the coil spring in the housing are on the same frame side, and are thus conveniently oriented in the same direction.

The arm support module can also comprise an arm side shaft protruding from the arm side surface on the frame side of the camera holding arm, and a frame shaft hole that is formed in the frame to allow the arm side shaft to be fitted therein and that axially supports the camera holding arm rotatably about the axis of rotation by means of the arm side shaft, where the camera holding arm can be such that the housing is partitioned in the form of a recess excavated inside the camera holding arm on the inside of the arm side shaft, the opening of the recess being located on the inside of the frame shaft hole. This makes operations more convenient because the coil spring can be housed through the opening in the recess which serves as the housing for the coil spring while the camera holding arm is rotatably supported on the frame.

A restriction member that restricts the spring axial movement of the coil spring in the housing can also be provided to prevent accidental operation of the housed coil spring in the axial direction. As such, because both ends of the coil spring are reliably engaged with the camera holding arm side and table side, the coil spring will always build up coil spring stress, ensuring more reliable assistance.

This type of arm rotation axial support is suitable for a camera head support arm which rotatably axially supports a camera side arm supporting the camera head and a table side arm engaged with the table.

Namely, an imaging device for imaging an imaging-object mounted on a table by means of a camera head from above the table, comprising:

a table side arm engaged with the table;

a camera side arm supporting the camera head;

an arm support module axially supporting the camera side arm rotatably about the axis of rotation relative to the table side arm, and allowing the camera side arm to assume a first arm attitude wherein the camera side arm is rotated relative to the table side arm so that the camera head assumes an attitude for imaging the imaging-object, and a second arm attitude wherein the camera side arm is rotated relative to the table side arm so that the camera side arm overlaps the table side arm;

an assist member between the camera side arm and table side arm, which assists the arm rotation of the camera side arm in such a way that, when the camera side arm rotates from the first attitude to the second attitude, the assist member builds up assisting force that will be exerted on the side where the camera side arm will rotate into the first attitude, and when the camera side arm does rotate from the second attitude into the first attitude, the assist member allows the built up assisting force to be exerted on the camera side arm about the axis of rotation; and a frictional force adjustment module for generating frictional force when the camera side arm rotates about the axis of rotation, and for adjusting the frictional force so that it is greater than the assisting force built up by the assist member, the assist member being interposed between the camera side arm and table side arm by being housed in housing that has been compartmentalized about the axis of rotation in the interior of the camera side arm, which is hollow.

DESCRIPTION OF THE PREFERRED EMBODIMENTS

Figure 1:
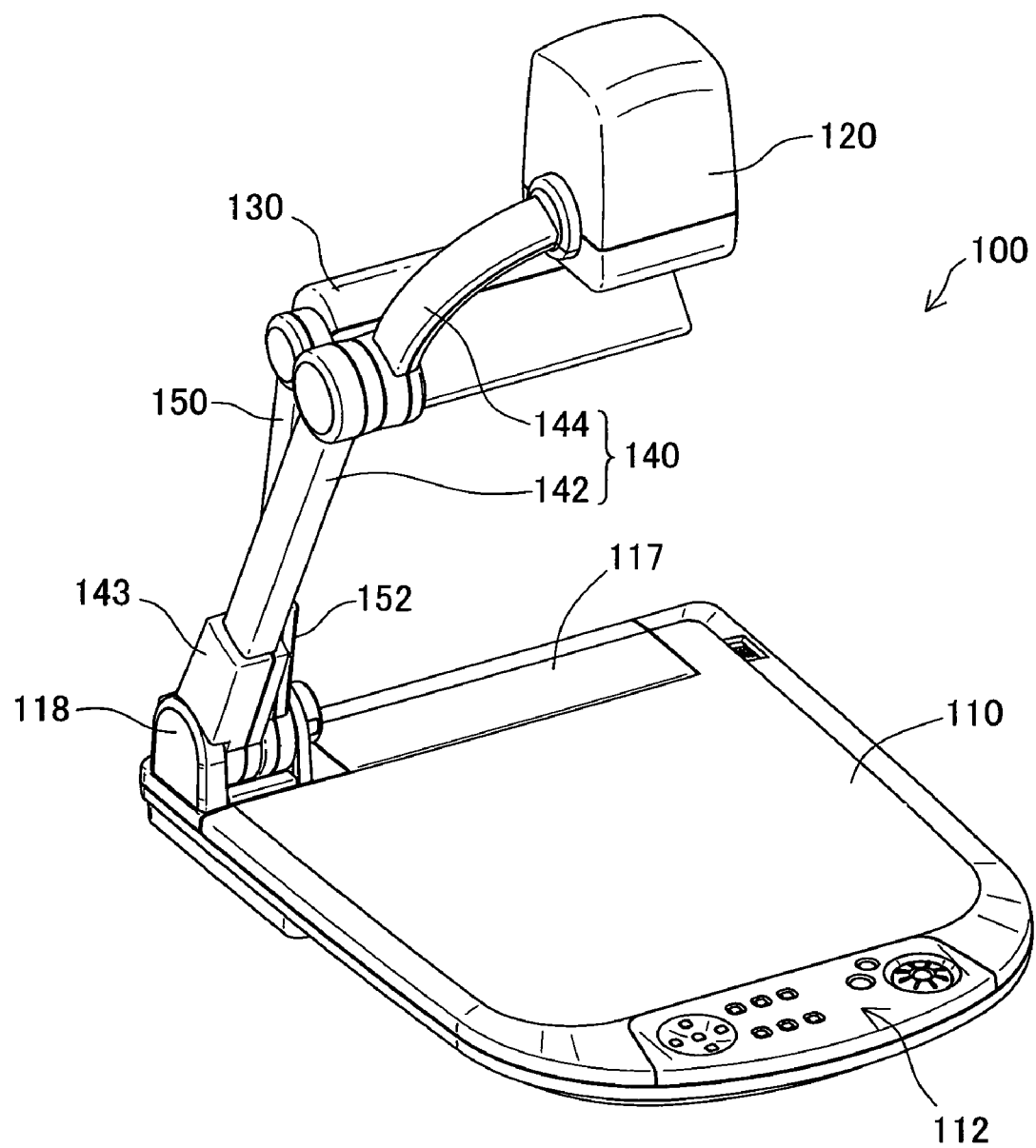
FIG. 1 is a perspective view of an imaging device 100 of an embodiment.
Figure 2:
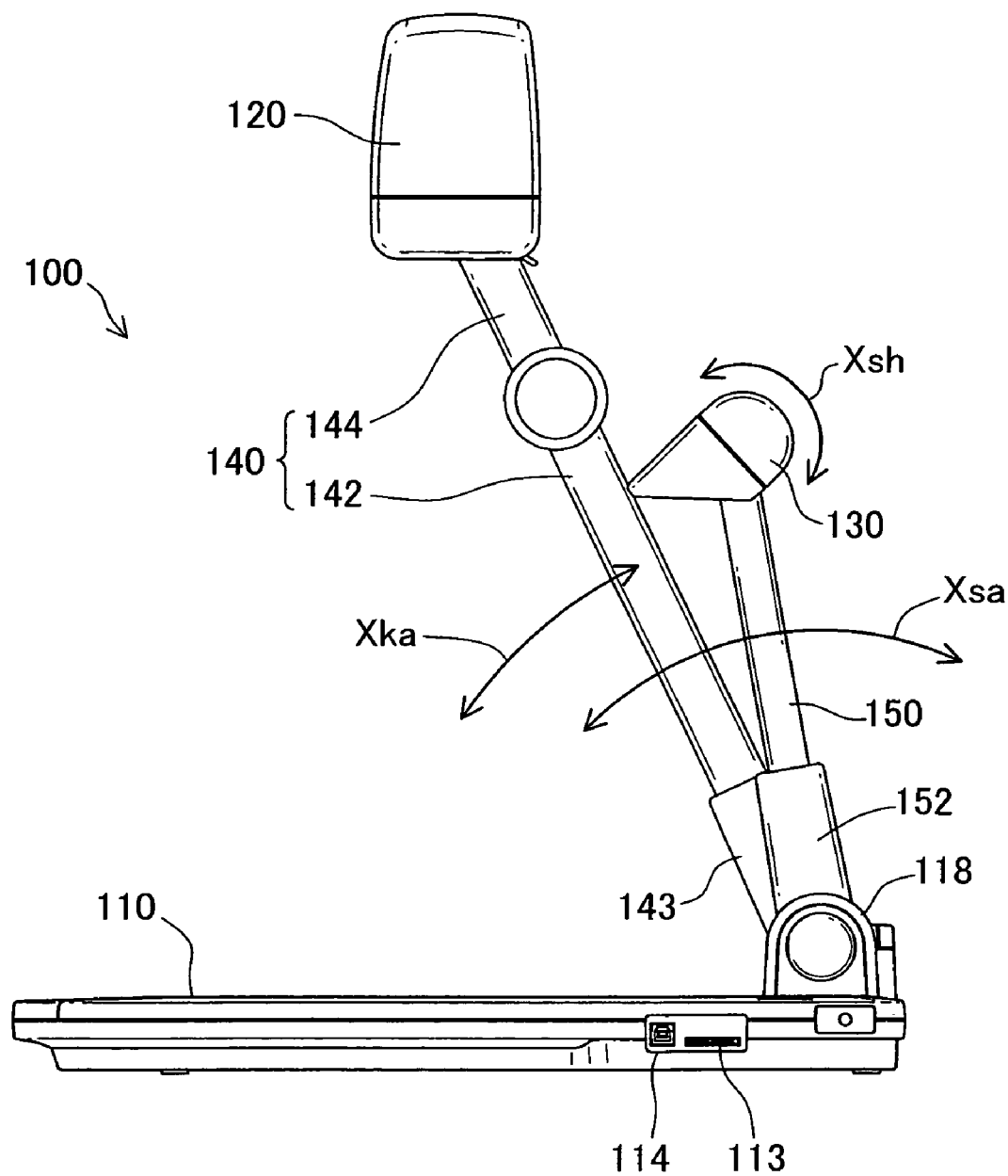
FIG. 2 is a right side view of the imaging device 100.
Figure 3:
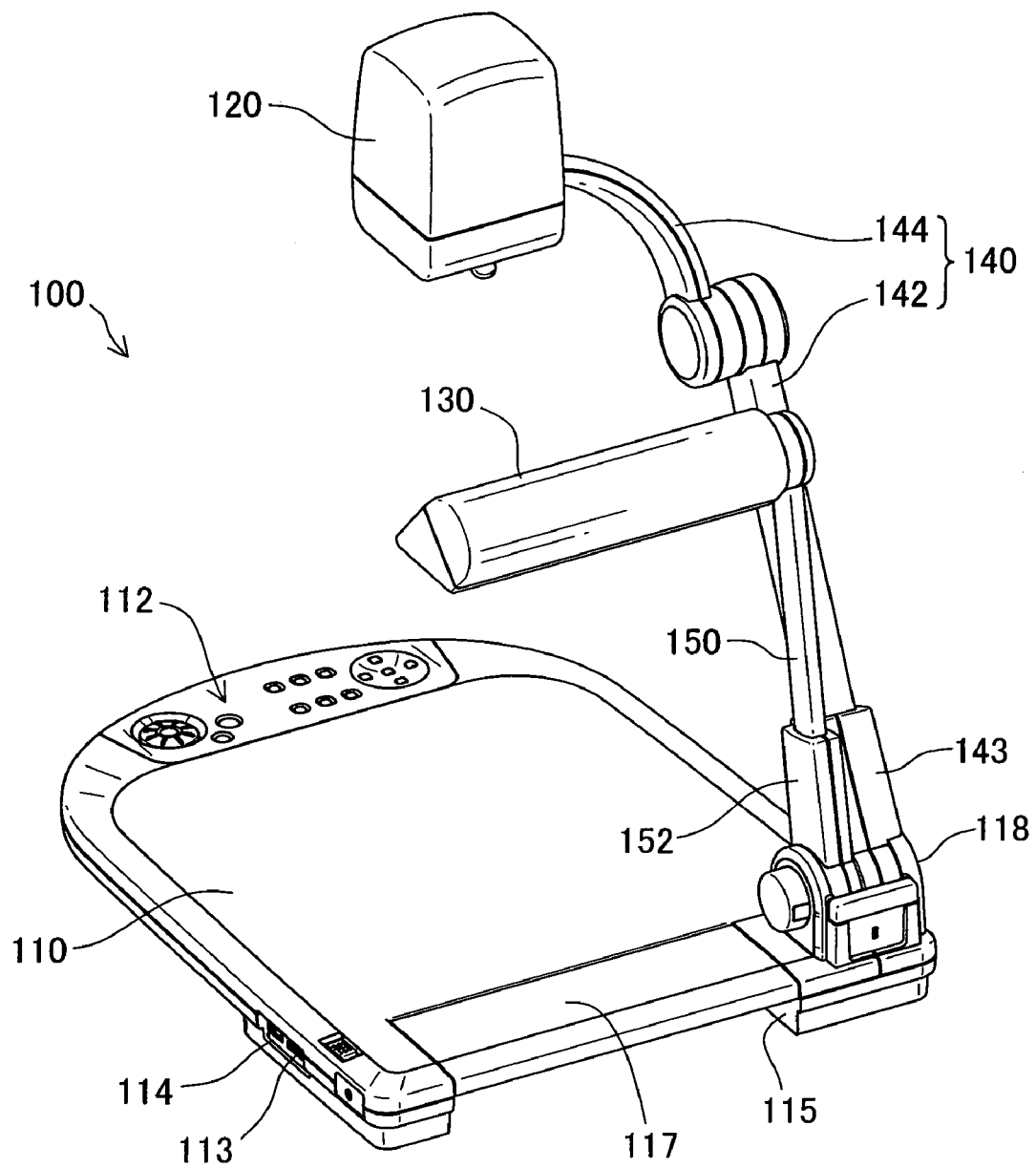
FIG. 3 is a rear perspective view of the imaging device 100.

The following describes modes for embodying the present invention in terms of examples based on drawings. FIG. 1 is a perspective view of an imaging device 100 of an embodiment; FIG. 2 is a right side view of the imaging device 100; FIG. 3 is a rear perspective view of the imaging device 100.

As shown in the drawings, the imaging device 100 includes: a table 110 on which a target object is mounted; a camera head 120 that images the target object (not shown) on the table 110; and an illumination unit 130 that illuminates the target object on the table 110. The table 110 is a square-shaped tablet with a rounded fore side, and has a group of switches 112 on top of the fore side and a memory card slot mechanism 113 and an USB (universal Serial BUS) terminal 114 at right-rear end of a side wall. The group of switches 112 includes switches for settings such as zoom, auto-focus, iris, and white balance as well as switches such as for setting device functions or for writing memory data. However, details of these switches are not described herein, for they are not immediately related to the scope of the present invention.

As shown in FIG. 3, the table 110 further includes: a recess 115 that notches a top surface of the table at rear end of the side wall around the table; and a group of connectors 116 for connection with external devices (which will be described later) at inner end of the recess. The table 110 further includes a cover 117 at the rear end in an openable and closable manner and uses the cover 117 to cover the notched portion of the table top surface within the recess 110. The cover 117 opens and closes like a flap, and in a closed state shown in FIG. 3, becomes substantially coplanar with the table top surface and makes the cover surface continuous with the table top surface.

The camera head 120 is held with respect to the table 110 by means of a camera holding arm 140. The camera holding arm 140 includes a table side arm 142 and a camera side arm 144, and is rotatably held to the table 110 at a base 143 of the table side arm 142. The camera side arm 144 is fixedly connected with the camera head 120 and is rotatably connected with the table side arm 142. The camera head 120, therefore, can rotate at leading end of the table side arm 142 in a manner integral with the camera side arm 144.

The illumination unit 130 is held with respect to the table 110 by means of an illumination unit holding arm 150. The illumination unit holding arm 150 is rotatably held to the table 110 at its base 152 and rotatably holds the illumination unit 130 at its leading end.

Figure 4:
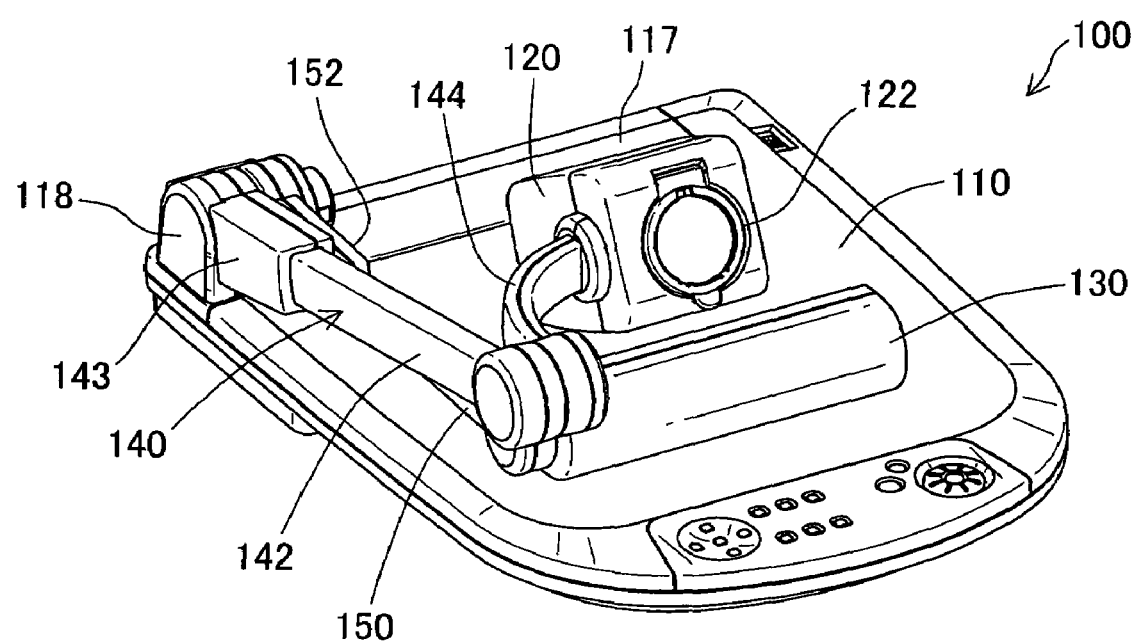
FIG. 4 is a perspective view of the imaging device 100 at its storage, carriage, or custody, where both of a camera holding arm 140 and an illumination unit holding arm 150 are rotated into a position at a table side.
Figure 5:
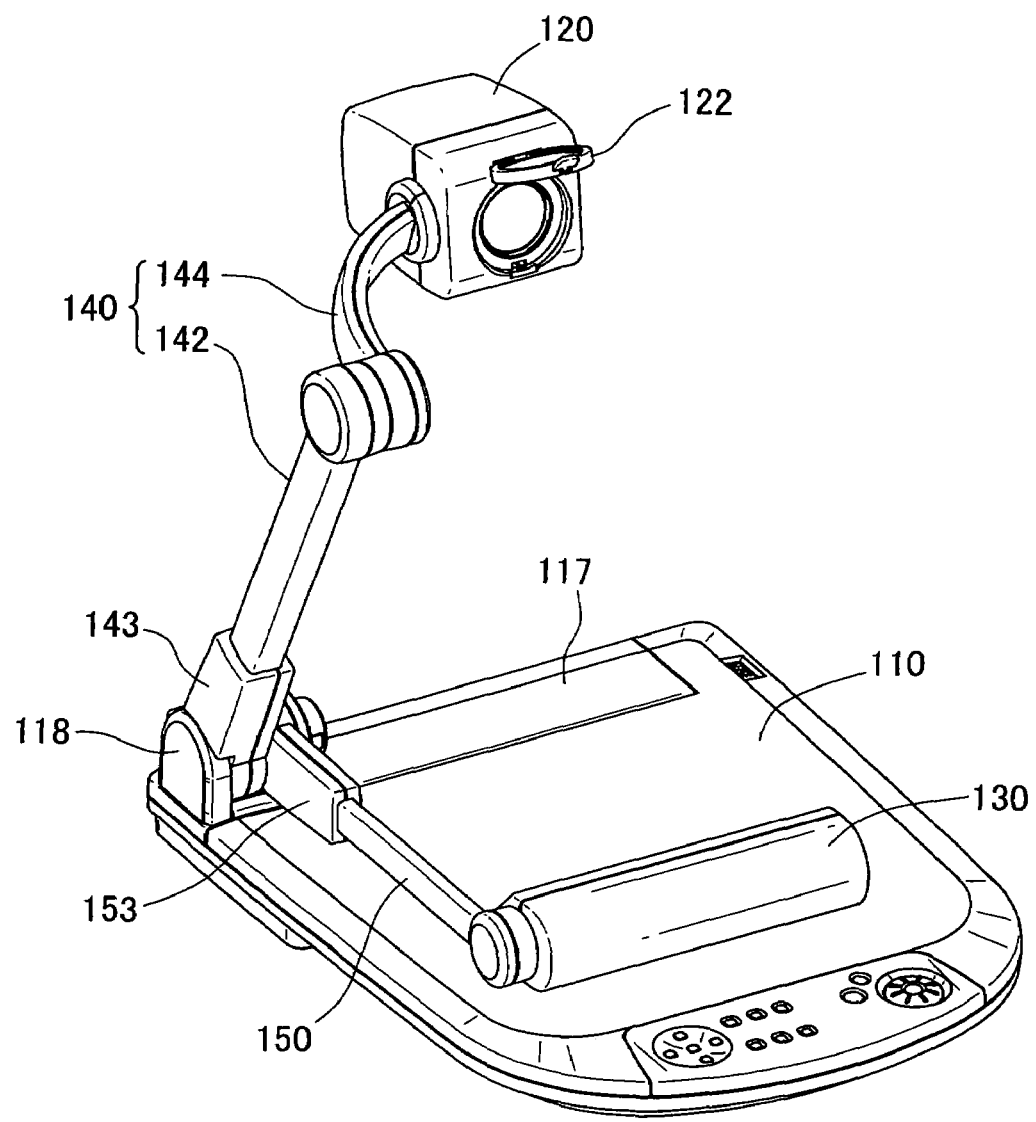
FIG. 5 is a perspective view of the imaging device 100 in a mode of imaging frontward of the device.
Figure 6:
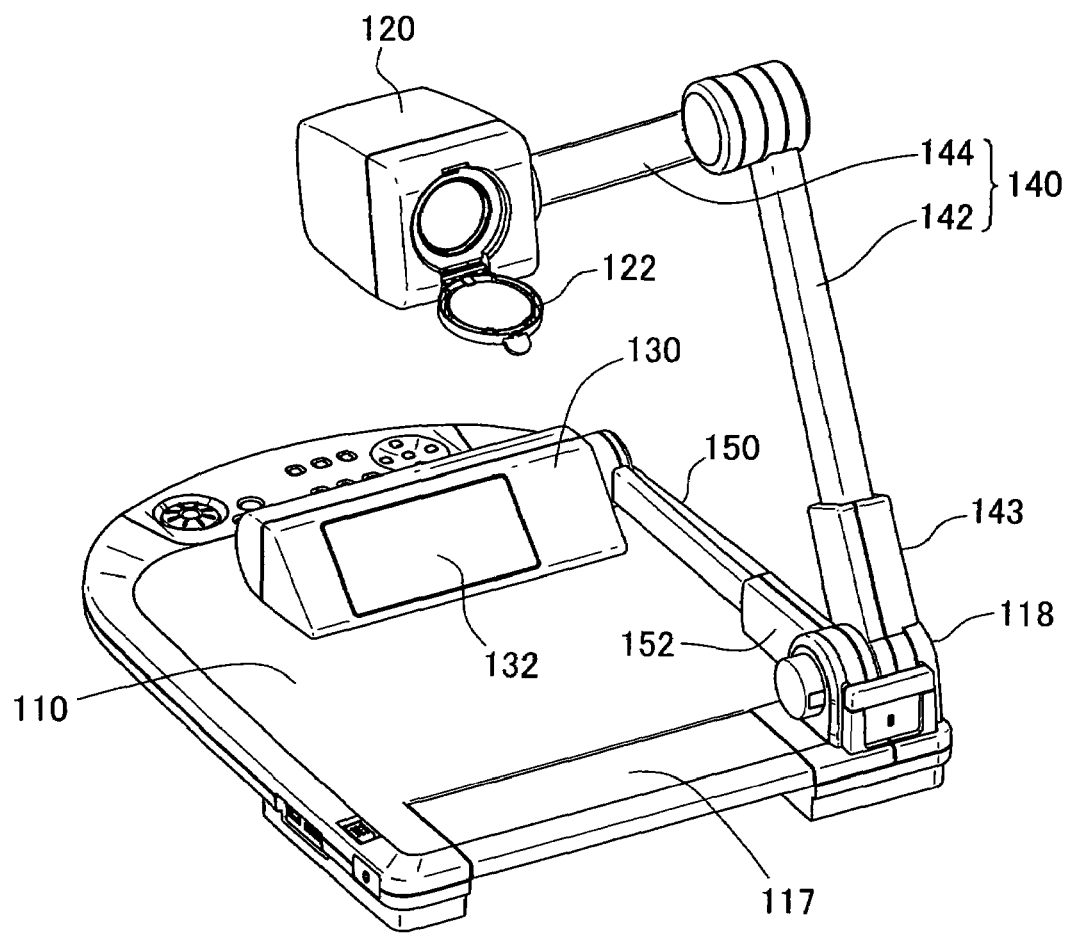
FIG. 6 is a perspective view of the imaging device 100 in a mode of imaging rearward of the device.

The camera holding arm 140 and the illumination unit holding arm 150 are rotatably and coaxially supported by an elevated portion 118 that is located at an inner-left corner of the table 110, and are coaxially rotated with respect to the table 110 to vary their degrees of inclinations with respect to the table 110. Having these rotatably and coaxially supported arms, the imaging device 100 can take various modes as the arms rotate. The following describes the various modes that can be taken by the imaging device 100, before describing the mechanism for rotatably and axially supporting the arms. FIG. 4 is a perspective view of the imaging device 100 in its storage, carriage, or custody, where both of the camera holding arm 140 and the illumination unit holding arm 150 are rotated into a position at a table side; FIG. 5 is a perspective view of the imaging device 100 in a mode of imaging frontward of the device; and FIG. 6 is a perspective view of the imaging device 100 in a mode of imaging rearward of the device.

As can be seen from the above details of how the arms and the illumination unit 130 are axially supported, the camera holding arm 140 is rotated to vary its degree of inclination with respect to the table 110, as indicated by an arrow Xka in FIG. 2, and is rotatable from the mode shown in FIG. 2, FIG. 1, or FIG. 3 to a mode where camera head 120 gets close to the top surface of the table 110. At the time of imaging the target object mounted on the table 110, the camera head 120 takes an attitude (imaging attitude) shown in FIGS. 1 to 3 and images the target object from above the table. It should be noted herein that, when the camera head 120 takes this imaging attitude, a stopper of the support mechanism described below regulates the rotation of the camera holding arm 140 and thereby maintains the camera holding arm 140 at a maximum degree of inclination (maximum inclination) with respect to the table 110.

The illumination unit holding arm 150 is rotated to vary its degree of inclination with respect to the table 110, as indicated by an arrow Xsa in FIG. 2, and is rotatable from the mode shown in FIG. 2 to a mode where the illumination unit 130 gets close to the top surface of the table 110. The illumination unit holding arm 150 is also rotatable to a mode where the illumination unit 130 reaches a position posterior to the position shown in FIG. 2. The illumination unit 130 is rotated at the connection with the illumination unit holding arm 150, in a manner indicated by an arrow Xsh in FIG. 2. At the time the target object mounted on the table 110 is imaged, the illumination unit holding arm 150 is located posterior to the camera holding arm 140 and the illumination unit 130 generally takes an attitude posterior to the camera head 120 (illuminating attitude) shown in FIG. 2. The illumination unit 130 in this attitude illuminates the target object mounted on the table 110 obliquely from above the table.

Besides the mode of imaging the target object on the table top surface, the imaging device 100 is also configurable into a mode of storage shown in FIG. 4. In this mode, the illumination unit holding arm 150 is rotated to minimize its degree of inclination with respect to the table 110, so that the illumination unit 130 gets close to the top surface of the table 110 and takes a table side illumination unit attitude where an outer wall of a casing of the illumination unit 130 is laid over the table 110. As for the camera holding arm 140, the table side arm 140 is rotated to minimize its degree of inclination with respect to the table 110 and the camera side arm 144 is rotated approximately an angle of 180 degrees at the connection with the table side arm 142, so that the camera side arm 144 and the table side arm 142 may appear overlapped from a lateral view. These rotations of the arms enable the camera head 120 to take a table side camera head attitude where it gets close to the top surface of the table 110, with a closeup lens 122 at fore side facing obliquely upward.

In other words, by going through the rotations of the camera holding arm 140 and the illumination unit holding arm 150 as described above, the camera head 120 shifts the attitude from the previously described imaging attitude shown in FIGS. 1 to 3 to the table side camera head attitude shown in FIG. 5 and holds itself in the attitude. The same applies to the illumination unit 130, which shifts the attitude from the previously described illuminating attitude shown in FIGS. 1 to 3 to the table side illumination unit attitude shown in FIG. 4 and holds itself in the attitude.

The imaging device 100 also takes a mode of frontward imaging shown in FIG. 5. In this mode, the camera head holding arm 140 rotates the camera side arm 142 into a position at the rear side of the device while keeping the table side arm 142 in the previously described maximum inclination. Therefore, the camera head 120 becomes frontward-faced and images the target object at the front side of the device. The imaging device 100 also takes a mode of rearward imaging shown in FIG. 6. In this mode, the camera head holding arm 140 rotates the camera side arm 142 into a position at the front side of the device while keeping the table side arm 142 also in the maximum inclination. Therefore, the camera head 120 becomes rearward-faced and images the target object at the rear side of the device.

The camera head 120 in the mode of frontward imaging or rearward imaging may alternatively be not equipped with the closeup lens 122. In the modes of frontward imaging and rearward imaging, the rotated position of the camera side arm 144 with respect to the table side arm 142 can be defined by a restraint mechanism (not shown) that is incorporated in the rotatable connection between the camera side arm 144 and the table side arm 142.

In case where the camera head 120 is in the mode of frontward imaging or rearward imaging, the illumination unit 130 can take the attitude where it is laid over the table 110, as shown in FIG. 5 and FIG. 6. The illumination unit 130, however, may arbitrarily be adjusted into any other attitude as long as it does not interfere with the frontward imaging or rearward imaging. The illumination unit 130 has a slanted area for irradiation of illumination light and the area includes a window 132 for transmission of the irradiated illumination light. Therefore, in the mode of rearward imaging shown in FIG. 6, the illumination unit 130 can be used for the target object both as an illumination light source and as a supplementary light source.

Figure 7:
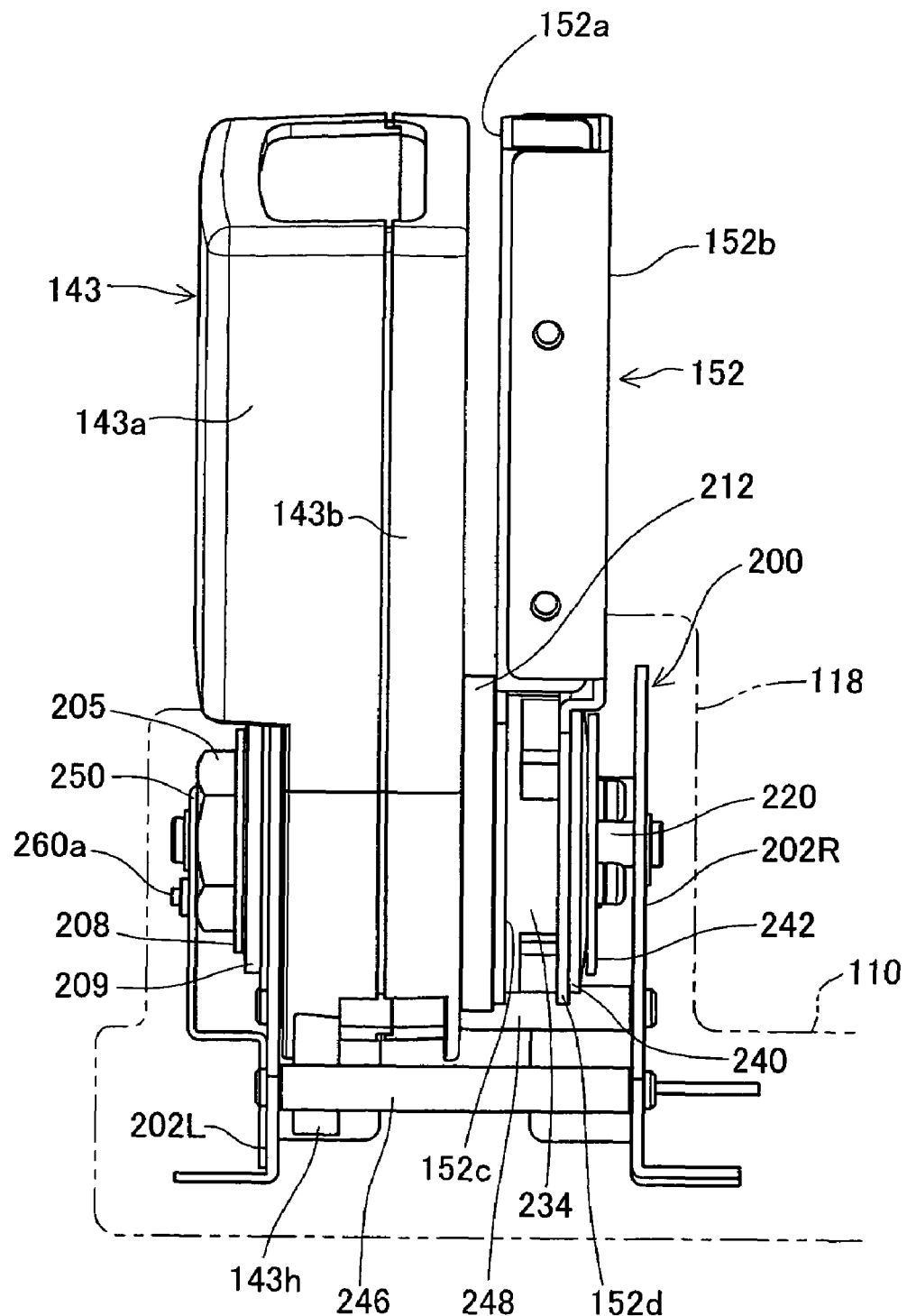
FIG. 7 is a schematic view where an arm support mechanism 200 in an elevated portion 118 is depicted with a cover removed to facilitate description.
Figure 8:
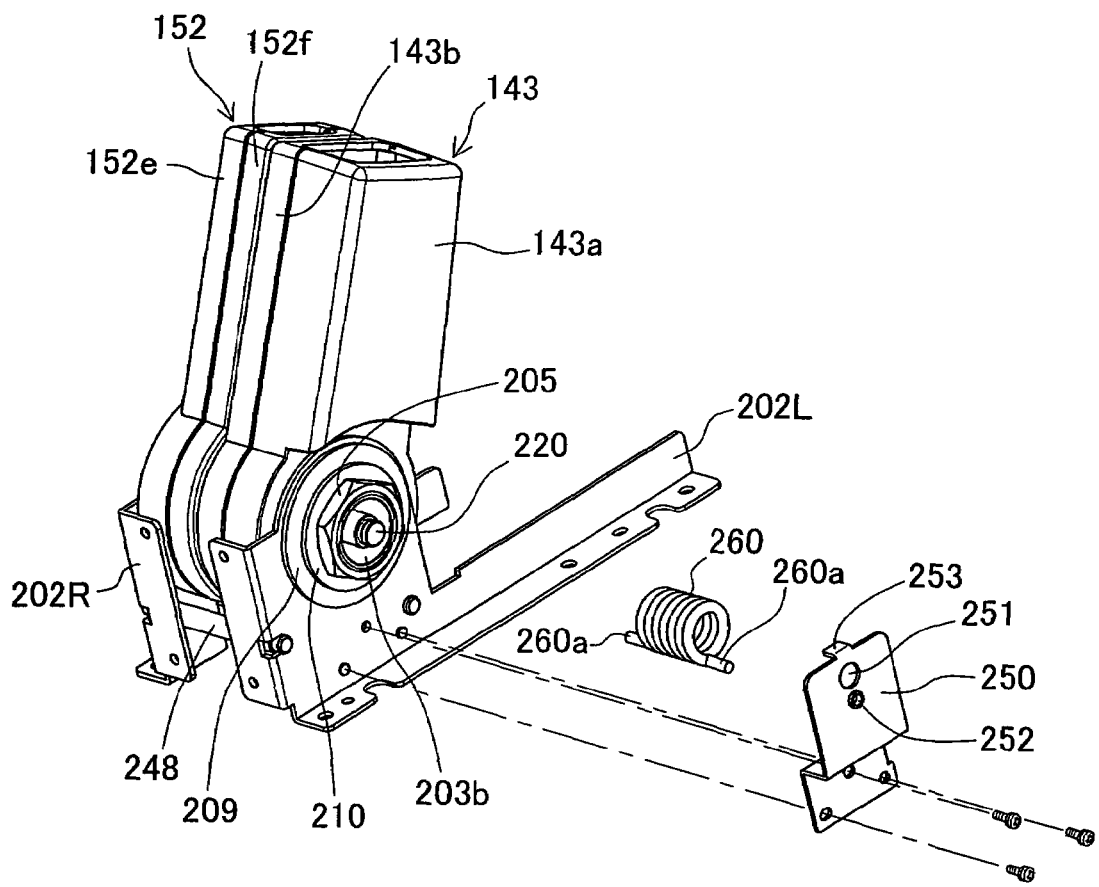
FIG. 8 is a sub assy view of the main parts of the arm support mechanism 200.
Figure 9:
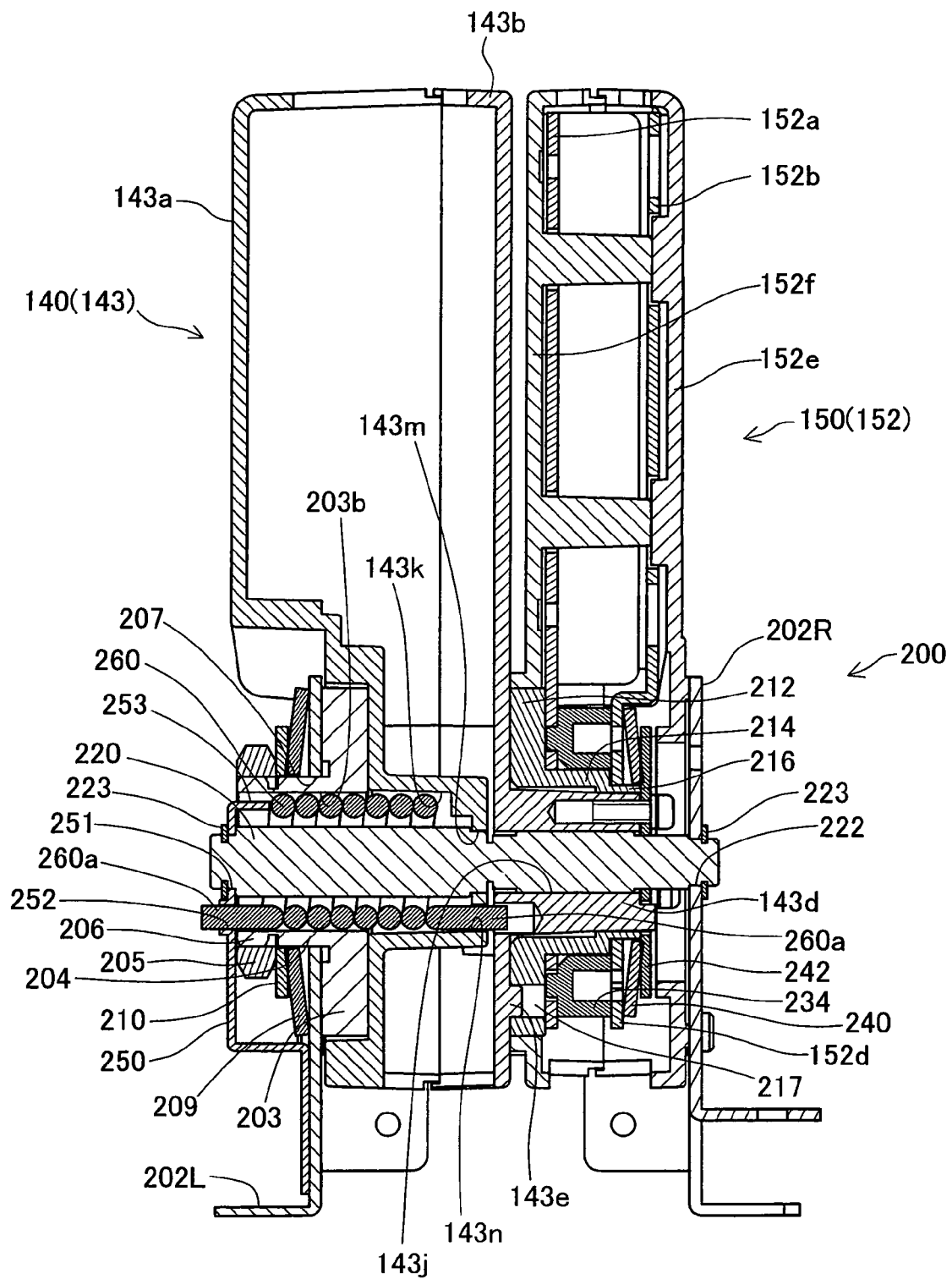
FIG. 9 is a cross-sectional view where the arm support mechanism 200 is depicted along a vertical line of FIG. 7 with an axis of the arm support mechanism contained therein.
Figure 10:
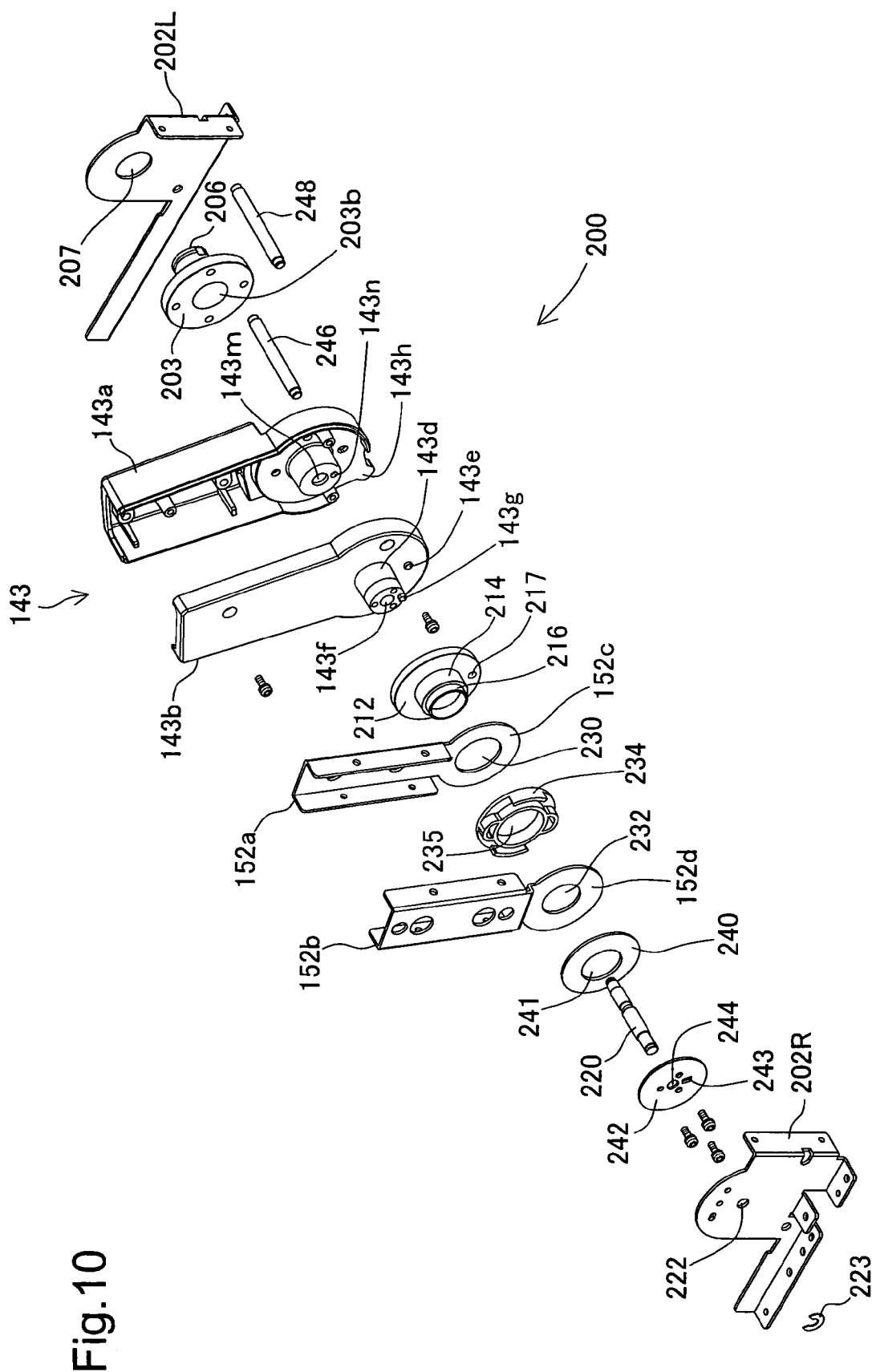
FIG. 10 is an exploded perspective view where parts of the arm support mechanism 200 are dismounted and depicted from back side of the device.
Figure 11:
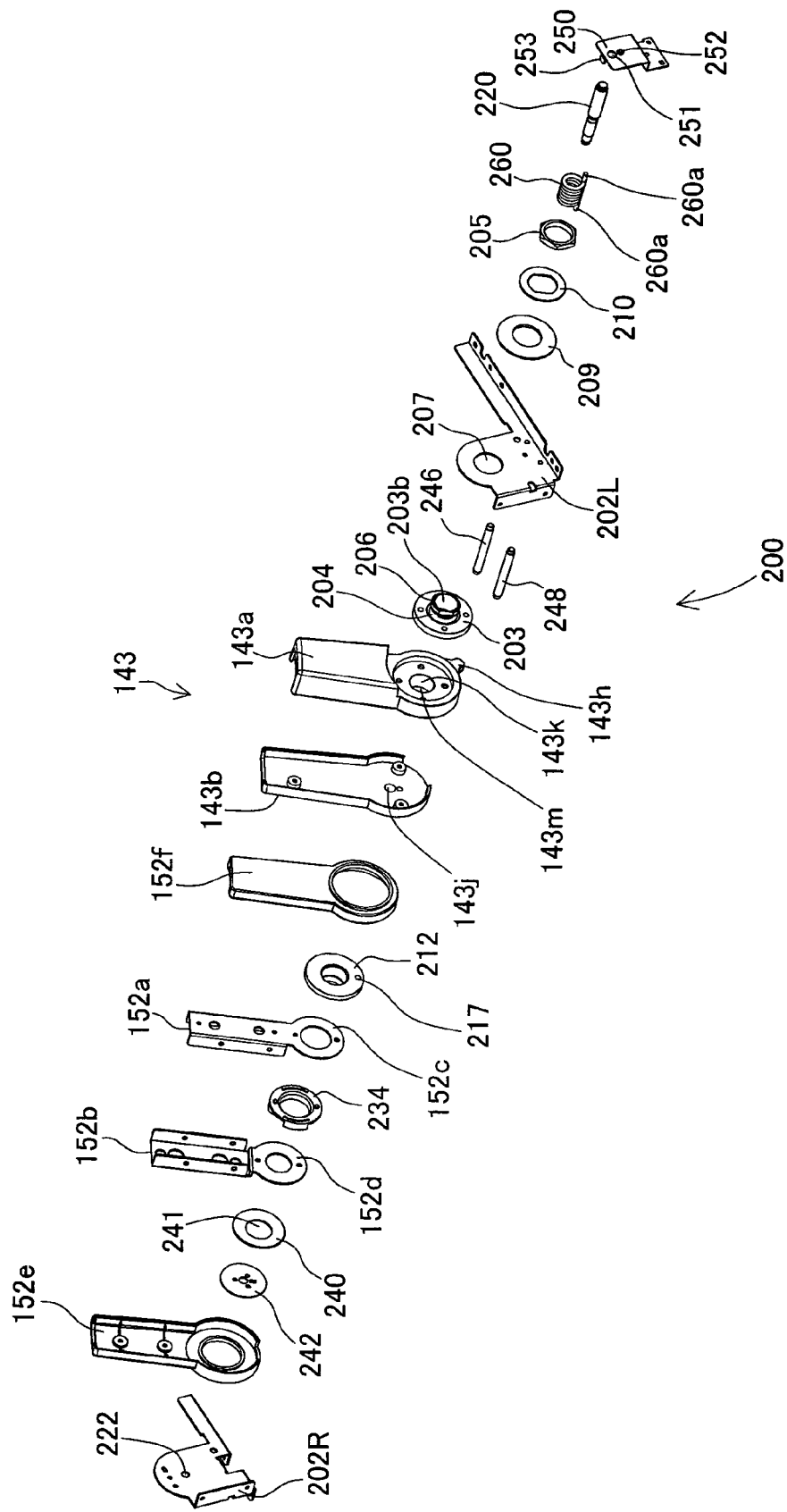
FIG. 11 is a cutaway perspective view of the arm support mechanism 200 as viewed from the device side.

The following describes the mechanism for axially supporting the camera holding arm 140 and the illumination unit holding arm 150. FIG. 7 is a schematic view where an arm support mechanism 200 in the elevated portion 118 is depicted with a cover removed to facilitate description; FIG. 8 is a sub assy view of the main parts of the arm support mechanism 200; FIG. 9 is a cross-sectional view where the arm support mechanism 200 is depicted along a vertical line of FIG. 7 with an axis of the arm support mechanism contained therein; and FIG. 10 is an exploded perspective view where parts of the arm support mechanism 200 are dismounted and depicted from back side of the device; and FIG. 11 is a cutaway perspective view of the arm support mechanism 200 as viewed from the device side. In addition, the cover of the illumination unit support arm 150 in FIG. 7 is not illustrated in the parts located on the outside of the plate 202L in FIG. 10.

As shown in these drawings, the arm support mechanism 200 includes right and left plates 202L, 202R that are fixed to a bony framework (not shown) of the table 110 in an opposing manner, and holds the camera holding arm 140 (specifically, the base 143) and the illumination unit holding arm 150 (specifically, the base 152) between the plates. The base 143 of the camera holding arm 140 is configured by a first part 143a and a second part 143b made of aluminum die-casts, which are positioned with respect to each another and then joined together. The base 143 is thus hollow in the interior. Furthermore, as illustrated in FIG. 9, the base 152 of the illumination unit support arm 150 is constructed by covering the first part 152a and second part 152b with left and right covers 152e and 152f. It should be noted herein that, since FIG. 10 and FIG. 11 are views depicted from the back side of the device, the parts are showed in a reversed order when compared to those shown in FIG. 7 and FIG. 9. The same applies to the other parts that will be described below.

The first part 143a in the table side arm 142 of the camera holding arm 140 has a floored recess 143c excavated in the side of the second part 143b, and a through hole 143m being provided in the center of the recess floor. The first part 143a has a first support shaft main member 203. The first support shaft main member 203 has a first main shaft 204 in the center, the end of which composes a screw thread shaft 206 for a nut 205. The first main shaft 204 is fitted into a support hole 207 formed in the plate 202L, thereby fixing the first support shaft main member 203 to the plate 202L with the nut 205, a coned disc spring 209 and a plain washer 210 being interposed therebetween. The base 143, therefore, is axially supported by the first main shaft 204 of the first support shaft main member 203 on the side of the first part 143a. In such an arrangement, frictional force that is generated at the time the first main shaft 204 rotates in the support hole 207, that is, frictional force during rotation of the camera holding arm 140, is adjusted by calibrating the deflection level of the coned disc spring 209 by means of the nut 205. In this case, the first support shaft main member 203 is positioned so that the first main shaft 204 is concentric with the through hole 143m of the recess 143k, and is fixed to the first part 143a by a bolt (not shown).

The second part 143b has a columnar projection 143d on the other side of the recess 143c of the first part 143a, and a second support shaft member 212 being positioned and attached to the columnar projection. Details of how the second support shaft member 212 is fixed will be described later. The second support shaft member 212 has a second support shaft 214 in the center, the end of which composes a shaft portion 216 for ensuring space for fastening the base 152. The second support shaft member 212 also has a positioning opening 217 on a flange portion, a projection 143e in the second part 143b being fitted into the opening 217, permitting it to be positioned at and integrated with the second part 143b and thus the base 143 (camera holding arm 140).

The attachment of the second support shaft member 212 and the first support shaft main member 203 to the base 143 is adjusted such that the second support shaft 214 of the second support shaft member 212 and the first main shaft 204 of the first support shaft main member 203 become coaxial with each other. Therefore, the second support shaft 214 of the second support shaft member 212 becomes concentric with the first main shaft 204 and enables the second support shaft member 212 to rotate (turn) in integration with the base 143 (camera holding arm 140).

In this case, the columnar projection 143d has a first sub-shaft pin 220 fitted and fixed to a pin-fitting opening 143f located in the center, the first sub-shaft pin 220 being coaxial with the first main shaft 204. The first sub-shaft pin 220 is a shaft spanning left and right plates 202L and 202R, and is fitted into a support hole 222 in the side of the plate 202R where it is prevented from being removed by an E-ring 223. On the plate 202L side, it is fitted into a shaft support hole 251 of a bracket 250 fixed to the plate, where it is prevented from being removed by an E-ring 223. In this case, the support hole 207 of the left plate 202L and the support hole 222 of the right plate 202R are coaxial with each other. The base 143 (camera holding arm 140), therefore, is axially supported on both sides by the first sub-shaft pin 220 and first main shaft 204 fitted into the support hole 207, and rotates about this shaft. On that condition, the frictional force during such rotation can be controlled by adjusting the deflection level of the coned disc spring 209, which is achieved by calibrating the tightening of the nut 205. Furthermore, because the first sub-shaft pin 220 is fitted into the through hole 143m of the first part 143a and the through hole 143j of the second part 143b, the through hole 143m of the first part 143a and the through hole 143j of the second part 143b are coaxial at the base 143 where the first part 143a and second part 143b are joined.

The base 152 of the illumination unit holding arm 150 is configured by a first part 153a and a second part 153b made of press mold steel plates, which are positioned with respect to each other and then joined together, being covered on both sides by covers 152e and 152f. These two parts have through holes 230 and 232 provided at respective disc portions 152c and 152d at their lower ends, a resin spacer 234 being sandwiched between the two disc portions. The base 152 of the illumination unit holding arm 150 is attached to the second support shaft member 212 of the base 143 of the camera holding arm 140, with the spacer 234 sandwiched therebetween.

That is to say, the first part 152a is attached to the second support shaft member 212 such that the second support shaft 214 is fitted into the through hole 230 of the first part 152a, and then the spacer 234 is laid over the disc portion 152c such that the second support shaft 214 is fitted into a through hole 235 of the spacer 234. Thereafter, the second part 152b is attached such that the disc portion 152d is laid over the spacer 234 and the shaft portion 216 of the second support shaft member 212 is fitted into the through hole 232. Therefore, the illumination unit holding arm 150 is, more specifically the first part 152a and the second part 152b are, axially supported by the second support shaft 214 and the shaft portion 216 of the second support shaft member 212 from both sides of the base and rotates about this shaft in a manner that prevents the disc portions of the parts from being deformed due to the fastening that will be described later. Since the second support shaft 214 and the shaft portion 216 are concentric with the first main shaft 204 and the first sub-shaft pin 220, i.e. the rotating shaft of the camera holding arm 140, the camera holding arm 140 and the illumination unit holding arm 150 are coaxially and rotatably supported with respect to the table 110 such that their degrees of inclinations may be variable with respect to the table 110.

In order to adjust the frictional force during rotation of the illumination unit holding arm 150 (base 152) that is rotatably and axially supported as described above, the arm support mechanism 200 provides a coned disc spring 240 that is laid over and fixed to the disc portion 152d of the second part 152b by means of a plain washer 242. That is, the shaft portion 216 of the second support shaft member 212 is inserted into a through hole 241 of the coned disc spring 240, and then the plain washer 242 is fastened on the side of the columnar projection 143d of the second part 143b by means of three screw threads shown in the drawing. On that condition, the frictional force at the time the base 152 that is made by combining the first part 152a and the second part 152b (i.e. the illumination unit holding arm 150) rotates about the coaxial second support shaft 214 and shaft portion 216 of the second support shaft member 212 that is integrated with the base 143 of the camera holding arm 140, that is, the frictional force during rotation of the illumination unit holding arm 150 can be controlled by adjusting deflection level of the coned disc spring 240 by means of these screw threads. It should be noted herein that the plain washer 242 has three holes for receiving screw threads of a same pitch as well as another opening 243. The plain washer 242 is positioned with respect to the columnar projection 143d by fitting a projection 143g on the end face of the columnar projection 143d into the opening 243 and also fitting a reduced diameter portion of the first sub-shaft pin 220 into a central through hole 244.

The structure involved in assisting the rotation of the camera holding arm 140 will be described next. The round recess 143k in the first part 143a and the through hole 203b of the first support shaft main member 203 are connected at the base 143 of the camera holding arm 140, and the hollow area formed by the recess 143k and through hole 203b is used as the housing for the coil spring 260. The housing is the area about the central axis of the first sub-shaft pin 220 or first main shaft 204 axially supporting the rotation of the camera holding arm 140.

One end 260a of the two ends of the coil spring 260 is set into a through hole 143n formed in the first part 143a, and the other end 260a is set into the through hole 252 of the bracket 250. The bracket 250 is covered by the cover of the elevated portion 118 illustrated in FIG. 1, and the housed coil spring 260 is pressed by a protruding tab 253 bend to the side of the coil spring 260 on the top end. The coil spring 260 is thus prevented from being accidentally operated in the spring axial direction.

With the coil spring 260 housed in this manner, the end 260a cannot change position on the bracket 250 side fixed to the plate 202L, which is a part of the table 110. However, the end 260a of the spring on the first part 143a side, which is a part of the camera holding arm 140, can change position because the through hole 143n of the first part 143a rotates about the axis of the first sub-shaft pin 220B with the rotation of the camera holding arm 140. The changes in the position of the ends 260a of the spring produce coil spring stress relative to the coil spring 260. Details of the coil spring stress will be described later.

In the present embodiment, the frictional force during rotation of the illumination unit holding arm 150 after the adjustment of the deflection level of the coned disc spring 240 is controlled so that the frictional force during rotation of the camera holding arm 140 after the adjustment of the deflection level of the coned disc spring 209 is lower. The frictional force resulting from the adjustment of the deflection level of the coned disc spring 240 is also adjusted so that the frictional force is greater than the coil spring stress of the coil spring 260 above. The two arms of the image device 100 are thus rotated as follows after the above adjustments.

When the camera holding arm 140 is rotated about the first main shaft 204 and the first sub-shaft pin 220 on the both sides, the second support shaft member 212 that is integrated with the camera holding arm 140 rotates along with the camera holding arm 140. On the other hand, the illumination unit holding arm 150 is held to the second support shaft member 212 by means of the frictional force that arises from the deflection of the coned disc spring 240. When the camera holding arm 140 is rotated, the coned disc spring 240 that generates the above-mentioned frictional force on the illumination unit holding arm 150 exerts a force to press the illumination unit holding arm 150 into integration with the second support shaft member 212 (camera holding arm 140). Therefore, the illumination unit holding arm 150 is always rotated along with the camera holding arm 140.

In case where the illumination unit holding arm 150 is rotated, however, it results as follows. The illumination unit holding arm 150 is rotated against the frictional force that arises from the deflection of the coned disc spring 240 described above. The force that produces rotation of the arm 150 further acts on the camera holding arm 140 that is engaged to the illumination unit holding arm 150 via the second support shaft member 212 and also acts as a force that produces rotation of the arm 140. However, since the camera holding arm 140 is pressed against the first support shaft main member 203 by a force that arises from the deflection of the coned disc spring 209, and the frictional force that arises from the deflection of the coned disc spring 209 is controlled to a level that overcomes the frictional force that arises from the deflection of the coned disc spring 240 (i.e. the force that produces rotation of the illumination unit holding arm 150), the camera holding arm 140 does not change its inclined position with respect to the table 110 and remains at the position. Therefore, only the illumination unit holding arm 150 is solely rotated in this case.

In addition, the arm support mechanism 200 that rotatably and axially supports the arms described above also includes the following configuration for the purpose of defining end-of-rotation attitudes of the camera holding arm 140, i.e. end positions of the arm where the camera head 120 respectively takes the imaging attitude and the table side camera head attitude described above. As shown in FIGS. 7 to 11, the arm support mechanism 200 includes shafts 246, 248 that are bridged across the left plate 202L and the right plate 202R. The shafts not only define a spacing between the plates but also functions to reinforce the plates.

The camera holding arm 140 includes a projection 143h that protrudes from rim of the end of the first part 143a. The projection 143h is located between the shafts 246, 248 that are bridged across the plates. In case where the projection 143h contacts the shaft 246 i.e. the shaft of the near side in FIG. 7, the camera holding arm 140 forms a maximum angle of inclination with respect to the table 110 and holds the camera head 120 in the imaging attitude described above, and remains at the position. On the other hand, when the projection 143h contacts the shaft 248 i.e. the shaft of the far side in FIG. 8, the camera holding arm 140 forms a minimum angle of inclination with respect to the table 110 and holds the camera head 120 in the table side camera head attitude described above, and remains at the position.

Figure 12:
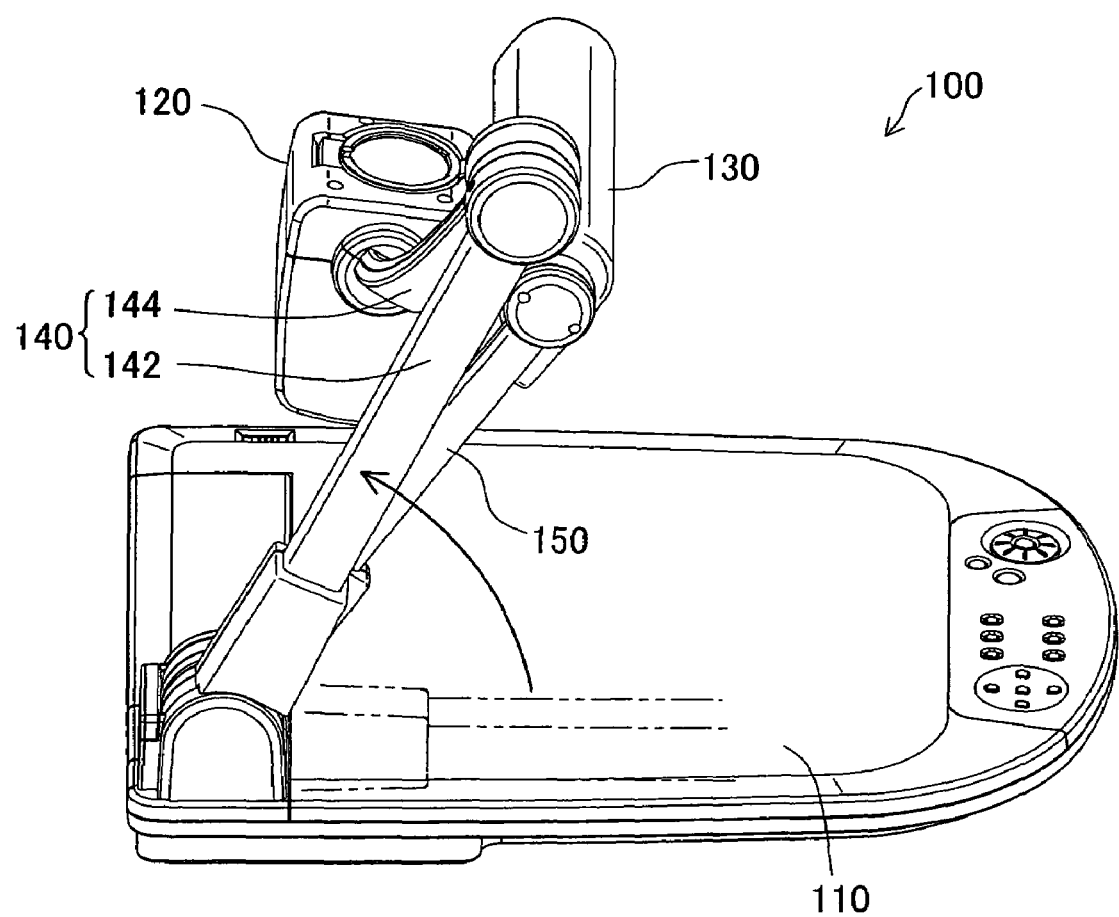
FIG. 12 is a schematic view that describes rotations of the arms shifting from a mode of storage, carriage, or custody of the imaging device 100 shown in FIG. 4 to a mode of imaging a target object.

The following describes rotations of the arms with respect to a case where the imaging device 100 of the above-described configuration is used. FIG. 12 is a schematic view that describes rotations of the arms shifting from the mode of storage, carriage, or custody of the imaging device 100 shown in FIG. 4 to a mode of imaging a target object; and FIG. 13 is a schematic view that shows a mode where the rotations of the arms have progressed from the mode shown in FIG. 11.

At the time of imaging a target object, the imaging device 100 holds the camera head 120 i.e. a precision instrument above the table 110 (see FIG. 1). At the time of storage, carriage, or custody of the device, however, the imaging device 100 is brought into the mode where both of the camera holding arm 140 and the illumination unit holding arm 150 are rotated into a position at the table side, for there is a possibility that a device of some kind accidentally collides with the camera head 120. This arrangement allows the camera head 120 that is at once a precision instrument and a heavy load to take a low position, and thereby improves stability of the device as well as reduces possibility of accidents such as the collision of devices.

In order to use the imaging device 100 that is in the mode of storage, a user of the device puts his (her) hand on the camera holding arm 140 or specifically the table side arm 142 and rotates the arm in a manner that pulls it up from the table side. At this time, the imaging device 100 not only rotates the camera holding arm 140 that is subjected to the rotating operation but also uses the arm support mechanism 200 described above to rotate the illumination unit holding arm 150 along with the camera holding arm 140, as shown in FIG. 12. That is, the illumination unit holding arm 150 rotates and leaves the attitude shown in FIG. 4 and inclines with respect to the table 110 as shown in FIG. 12, even if it is not subjected to any rotating operation. Since the stop position of the camera holding arm 140 and thus of the illumination unit holding arm 150 is defined by the contact of the projection 143h of the camera holding arm 140 and the shaft 248, as described previously (see FIG. 7 and FIG. 10.), the arms can be rotated all the way up to the stop position with good reproducibility.

Figure 13:
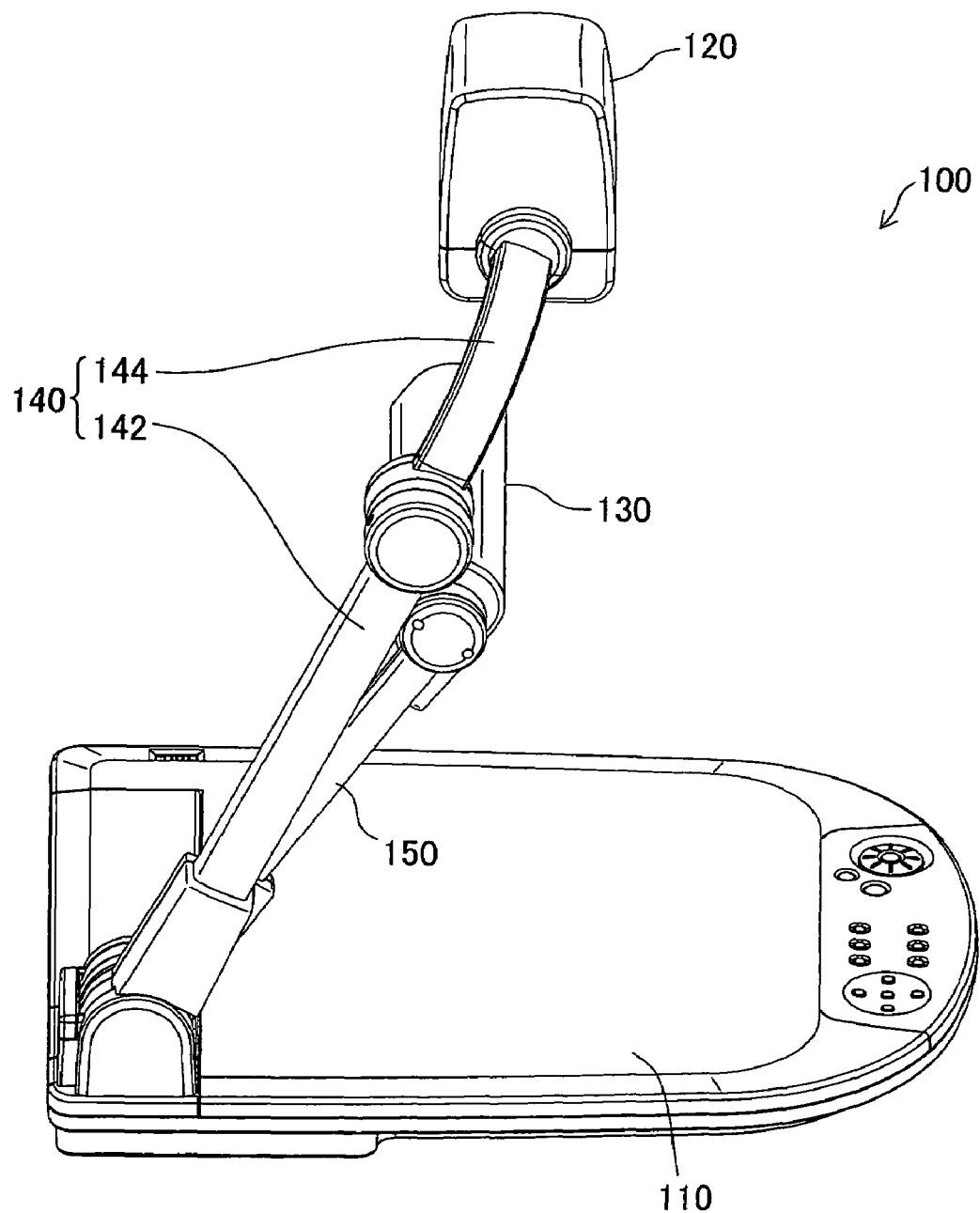
FIG. 13 is a schematic view that shows a mode where the rotations of the arms have progressed from the mode shown in FIG. 12.

In order to shift the device from the mode shown in FIG. 12 to the attitude prepared for imaging shown in FIG. 1, a user of the device puts his (her) hand on the camera side arm 144 of the camera holding arm 140 and rotates the arm approximately an angle of 180 degrees to make the arm continuous with the table side arm 142 as shown in FIG. 13. After this operation, the imaging device 100 has the camera head 120 in the attitude for imaging the target object on the table 110. On the other hand, in order to shift the illumination unit 130 into the illuminating attitude suitable for illuminating the target object, a user of the device puts his (her) hand on the illumination unit holding arm 150 and rotates the arm until it reaches a desirable position (for example, a position where the illumination unit 130 takes the illuminating attitude shown in FIG. 1.) At this time, the illumination unit holding arm 150 rotates independently and varies the degree of inclination with respect to the table 110 by means of the above-described axial support by the arm support mechanism 200. That is, the illumination unit holding arm 150 can rotate independently and form any angle with respect to the table 110 while the camera holding arm 140 is kept stopped and holds the camera head 120 in the imaging attitude. This arrangement enables the illumination unit holding arm 150 to rotate independently and thereby adjust the illumination unit 130 into various positions, in conformity with formation (three-dimensional, sheet-like, and the like) or property (whether the surface is glossy or not) of the target object or in the aim of avoiding glare of illumination in the camera head.

In order to shift the device from the mode of imaging shown in FIG. 1 to the mode of e.g. storage shown in FIG. 5, the arms can be rotated reversely. That is, a user of the device puts his (her) arm on the camera holding arm 140 or specifically the table side arm 142 and rotates the arm to bring the arm close to the table side (to minimize the degree of inclination). At this time, the imaging device 100 not only rotates the camera holding arm 140 that is subjected to the rotating operation but also uses the arm support mechanism 200 described above to rotate the illumination unit holding arm 150 along with the camera holding arm 150 and thereby brings the arm close to the table side. That is, the illumination unit holding arm 150 rotates and leaves the attitude shown in FIG. 1 and reduces the angle of inclination with respect to the table 110 as shown in FIG. 4, even if it is not subjected to any rotating operation. If the illumination unit holding arm 150 is inclined posterior to the position shown in FIG. 1, then the illumination unit holding arm 150 after the rotation along with the camera holding arm 140 still remains slightly inclined with respect to the table 110 even though the camera holding arm 140 is rotated until it forms the minimum angle of inclination. In this case, the illumination unit holding arm 150 may further be rotated independently until it forms the minimum angle of inclination with respect to the table.

After the camera holding arm 140 is rotated until it forms the minimum angle of inclination, the camera side arm 144 can be rotated approximately an angle of 180 degrees toward the table side arm 142, so that the imaging device 100 can take the attitude prepared for e.g. storage shown in FIG. 5. It should be noted herein that, in the rotations purposed for e.g. storage of the arms, the stop position of the camera holding arm 140 is also reproducible by the contact of the projection 143h and the shaft 246 (see FIG. 7 and FIG. 10) described previously.

The relationship between the coil spring stress of the coil spring 260 and the rotation of the camera holding arm 140 is as follows.

Both ends 260a of the coil spring 260 are linearly positioned with no spring load, as illustrated in FIG. 8. During the assembly of the arm support mechanism 200 and the assembly of the illumination unit holding arm 150 or camera holding arm 140 at the elevated portion 118, the camera holding arm 140 is virtually vertical relative to the table 110. As a result, the through hole 143n of the first part 143a and the through hole 252 of the bracket fixed to the plate 202 are arranged linearly, and in that state both the ends 260a of the coil spring 260 in the through hole 203b and recess 143k are introduced into the through holes 243n and through hole 252. When the shafts 246 and 248 are then introduced between the left and right plates 202L and 202R, the camera holding arm 140 is inclined from the vertical position to the imaging attitude illustrated in FIGS. 1 through 3, and is fixed (the arm is supported) by the nut 205 as the deflection level of the coned disc spring 209 is adjusted. Because of the slight change in position of the through hole 143 in the first part 143a about the spring axis of rotation when the arm is inclined from the vertical position to the imaging attitude, the coil spring 260 takes on a slight spring load through the spring end 260a, generating spring stress corresponding to the load.

When the camera holding arm 140 is rotated so as to be inclined from the imaging attitude toward the table 110 side, the through hole 143n of the first part 143a further changes position about the spring axis of rotation, and the coil spring 260 thus takes n even greater spring load through the spring end 260a, generating coil spring stress corresponding to the load. The coil spring stress serves as force about the central axis supporting the camera holding arm 140, and acts as force rotating the camera holding arm 140 so that the incline relative to the table 110 expands. Because the point of the coil spring stress action is a short distance from the center of the spring to the end of the spring 260a, the camera holding arm 140 will not rotate away from the table 110 side solely as a result of the coil spring stress. Because the frictional force is also adjusted by the adjustment of the deflection of the coned disc spring 209, the camera holding arm 140 will not rotate solely as a result of the coil spring stress. As the position rises, the coil spring 260 thus builds up the coil spring stress that is produced.

As illustrated in FIG. 12, when the camera holding arm 140 is rotated so that the incline relative to the table 110 expands, the through hole 143n changes position to the side where the spring displacement is released. The coil spring 260 acts on the camera holding arm 140 using the built up coil spring stress as force to rotate the camera holding arm 140 so that the incline relative to the table 110 expands. Because the moment at this time is consistent with the moment of the operating force rotating the camera holding arm 140 in such a way that the incline relative to the table 100 expands, the coil spring stress built up by the coil spring 260 acts as assisting force to the above operating force and can assist the arm rotation of the camera holding arm 140. This is far more convenient when the camera holding arm 140 supporting the heavy camera head 120 is pulled up from the table 110 side so that the incline expands.

The coil spring 260 should thus produce enough spring force to produce assisting force during the above rotation of the camera holding arm 140, without the need for the coil spring 260 to produce spring force allowing the camera holding arm 140 to be rotated or spring force allowing the camera holding arm 140 to be held at an incline. The coil spring 260 itself can thus be more compact, and the base 143 of the camera holding arm 140 housing the spring, and thus the elevated portion 118 which is the arm rotation support part, or the imaging device 100 itself, can be more compact.

Moreover, because the assisting coil spring 260 can be housed in the through hole 203b and recess 143k in the first part 143a of the camera holding arm 140, the coil spring 260 can be prevented from popping out of the camera holding arm 140, thus resulting in a more desirably compact elevated portion 118 at the table corner, where the arm is engaged on the table 110, and thus the table 110 or imaging device 100 itself. Furthermore, because the frictional force is adjusted from the table 202L side after the assembly of the coil spring 260 and the adjustment of the deflection of the coned disc spring 209, all operations can be oriented the same, resulting in better operability.

Because the coil spring 260 is prevent from being accidentally operated in the spring axial direction by the protruding tab 253 of the bracket 250 in the above arm support mechanism 200, both ends 260a of the coil spring 260 can be reliably engaged with the through hole 252 of the bracket 250 and the through hole 143n of the first part 143a. The reliability of the assistance can thus be increased because the coil spring stress is more reliably built up. Furthermore, because the coil spring 260 is mounted in the recess 143k of the first part 143a from the mounting side and can be fixed to the bracket 250, the assembly is easier, and maintenance of broken springs or the like is more convenient.

In the above arm support mechanism 200, the through hole 203b of the first support shaft main member 203 is connected to the floored recess 143k of the first part 143a in the base 143 of the camera holding arm 140, and the coil spring 260 is covered along the coiled portion by the recess wall surface and through hole wall surface. The coil spring 260 housed in the recess 143k is thus segmented by the recess walls in the hollow base 143 where the first part 143a and second part 143b are joined. When the hollow part of the base 143 is thus used to lay cable for power or signals in the camera head 120 at the arm tip, the cable will not interfere with the coil spring 260.

According to the imaging device 100 of the present embodiment, the illumination unit holding arm 150 is always caused to produce the previously described movement in response to the rotation of the camera holding arm 140, as described above. This simplifies rotations of the arms that are required to shift the imaging device 100 from the mode of use to the mode of e.g. storage or reversely from the mode of e.g. storage to the mode of use. Furthermore, the arm angle (degree of inclination with respect to the table 110) of the illumination unit holding arm 150 can be adjusted independently and arbitrarily to bring the illumination unit 130 into a position suitable for illuminating the target object. The usability of the device thus can be improved.

Additionally, in the present embodiment, the angle of the camera head arm 140 at the time the camera head 120 takes the imaging attitude (see FIG. 1) and the angle of the camera head arm 140 at the time the camera head 120 takes the table side camera unit attitude (see FIG. 4) are respectively defined by the contacts of the projection 143h of the camera holding arm 140 with the shaft 246 and the shaft 248 that are interposed between the right and left plates. This also improves operability of the camera holding arm 140 when subjected to the rotating operations.

Additionally, the camera holding arm 140 and the illumination unit holding arm 150 are coaxially and rotatably held by the arm support mechanism 200 in the present embodiment, which is preferable from the viewpoint of both reduction of the space and downsizing of the device. Additionally, the arm support mechanism 200 holds the arms based on the relationship between the holes and the shafts fitted therein, which is helpful in simplifying the device configuration.

In the present embodiment, the arm support mechanism 200 and the camera holding arms 140 and illumination unit holding arm 150 held by the arm support mechanism 200 are formed by using aluminum die-casts and pressed steel plates, and all of the constituent members of the arm support mechanism 200 are also made of metals except for the spacer 234. The constituent members of the arms and the arm support mechanism thus formed are then jointed together in an electrically conducting manner. Therefore, in the camera head 120 held by the camera holding arm 140 and in the illumination unit 130 held by the illumination unit holding arm 150, the constituent members of the respective arms and the constituent members of the support mechanism can be used as respective earth ground paths. This arrangement simplifies wire interconnections and makes wiring operations convenient.

Furthermore, in the present embodiment, the camera holding arm 140 and the illumination unit holding arm 150 are axially supported by the elevated portion 118 that is located at the inner-left corner on the top surface of the table 110; whereas no elevation for arm support is provided at a corner that is opposed to the support corner across the cover 117, i.e. at an inner-right corner of the table top surface. Also taking into consideration that the cover 117 becomes coplanar with the top surface of the table 110, it turns out that the inner-right corner of the table top surface can be used as a location for setting a target object, or also as a space for resetting the target object for purpose of changing which portion of the target object is to be imaged. This is also useful in downsizing the table.

The present invention is not limited to the above examples and embodiments, and can be implemented in a variety of modes without departing from the spirit thereof. For example, in the above embodiment, the camera holding arm 140 and illumination unit holding arm 150 were axially supported rotatably in a coaxial manner, and the illumination unit holding arm 150 can rotate independently of, and in unison with, the rotation of the camera holding arm 140, but the camera holding arm 140 and illumination unit holding arm 150 can also be axially supported so as to rotate about different axes of rotation.

In addition, because the camera holding arm 140 was axially supported rotatably by the table side arm 142 and the camera side arm 144, the above arm support mechanisms 200 can be incorporated where the rotation of both arms is axially supported. Specifically, plates corresponding to the plates 202L and 202R in the arm support mechanism 200 can be provided facing each other in the tip of the table side arm 142, and the camera side arm 144 can be provided with a first support shaft main member 203 or recess 143k. Thus, upon the rotatable axial support of the camera side arm 144 between the two plates at the table side arm 142 tip, the coil spring 260 can be incorporated between the two arms in the same manner as in the above embodiment. This will allow the rotation of the camera side arm 144 to be assisted in what is referred to as a "broken open" type of camera holding arm 140.

What is claimed is:

1. An imaging device for imaging an area of a table on which an imaging-object is to be mounted, comprising:

a camera holding arm that holds the camera head imaging from above the table;

an arm support module that rotatably supports the camera holding arm about the axis of rotation relative to the table so that the degree of incline relative to the table is variable;

an assist member between the camera holding arm and the table that assists the arm rotation of the camera holding arm in such a way that, when the camera holding arm rotates so as to incline toward the side of the table, the assist member builds up assisting force that is exerted on the side where the camera holding arm rotates so that the incline relative to the table expands, and when the camera holding arm rotates so that the incline relative to the table expands, the assist member allows the built up assisting force to be exerted on the camera holding arm about the axis of rotation; and a frictional force adjustment module that generates frictional force when the camera holding arm rotates about the axis of rotation, holds the camera holding arm in a position inclined relative to the table by means of the frictional force, and adjusts the frictional force so that it is greater than the assisting force built up by the assist member;

wherein the arm support module axially supports the camera holding arm rotatably about the axis of rotation relative to a frame which the table has for supporting the camera holding arm;

the camera holding arm compartmentalizes the housing in such a way that the assist member can be mounted in the housing from the side of the frame;

the frictional force adjustment module is frictional force-adjustably formed on the side of the frame; and the assist member, which is composed of a coil spring, is engaged at one end of the coil spring with the camera holding arm, and at the other end of the spring with the frame, while housed in the housing.

2. An imaging device in accordance with claim 1, wherein the camera holding arm includes a housing, compartmentalized inside the arm, for housing a member concentrically about the axis of rotation; and the assist member is housed in the housing of the camera holding arm.

3. An imaging device in accordance with claim 1, wherein the arm support module includes:

an arm side shaft protruding from the arm side surface on the frame side of the camera holding arm; and a frame shaft hole that is formed in the frame to allow the arm side shaft to be fitted therein, and that axially supports the camera holding arm rotatably about the axis of rotation by means of the arm side shaft; and the camera holding arm is such that the housing is partitioned in the form of a recess excavated inside the camera holding arm on the inside of the arm side shaft, the opening of the recess being located on the inside of the frame shaft hole.

4. An imaging device in accordance with claim 3, further comprising a restriction member that restricts the spring axial movement of the coil spring in the housing.

\* \* \* \* \*